Patented Sept. 8, 1942

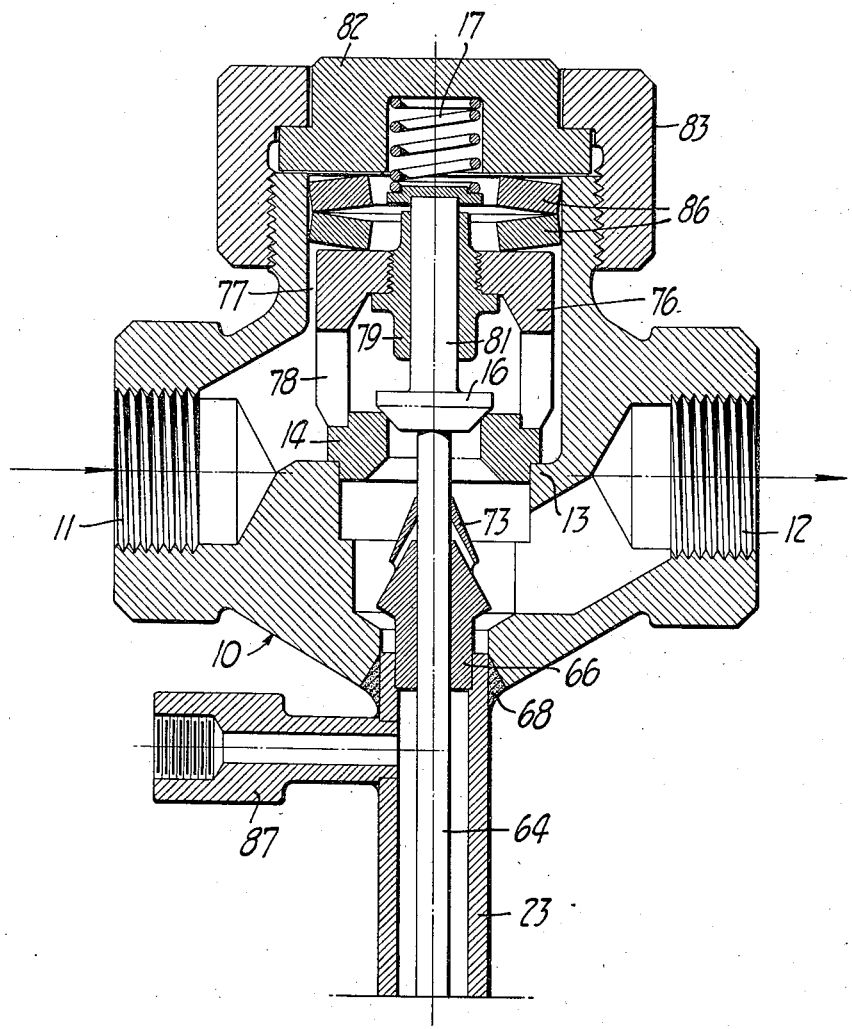
FIG_1A_

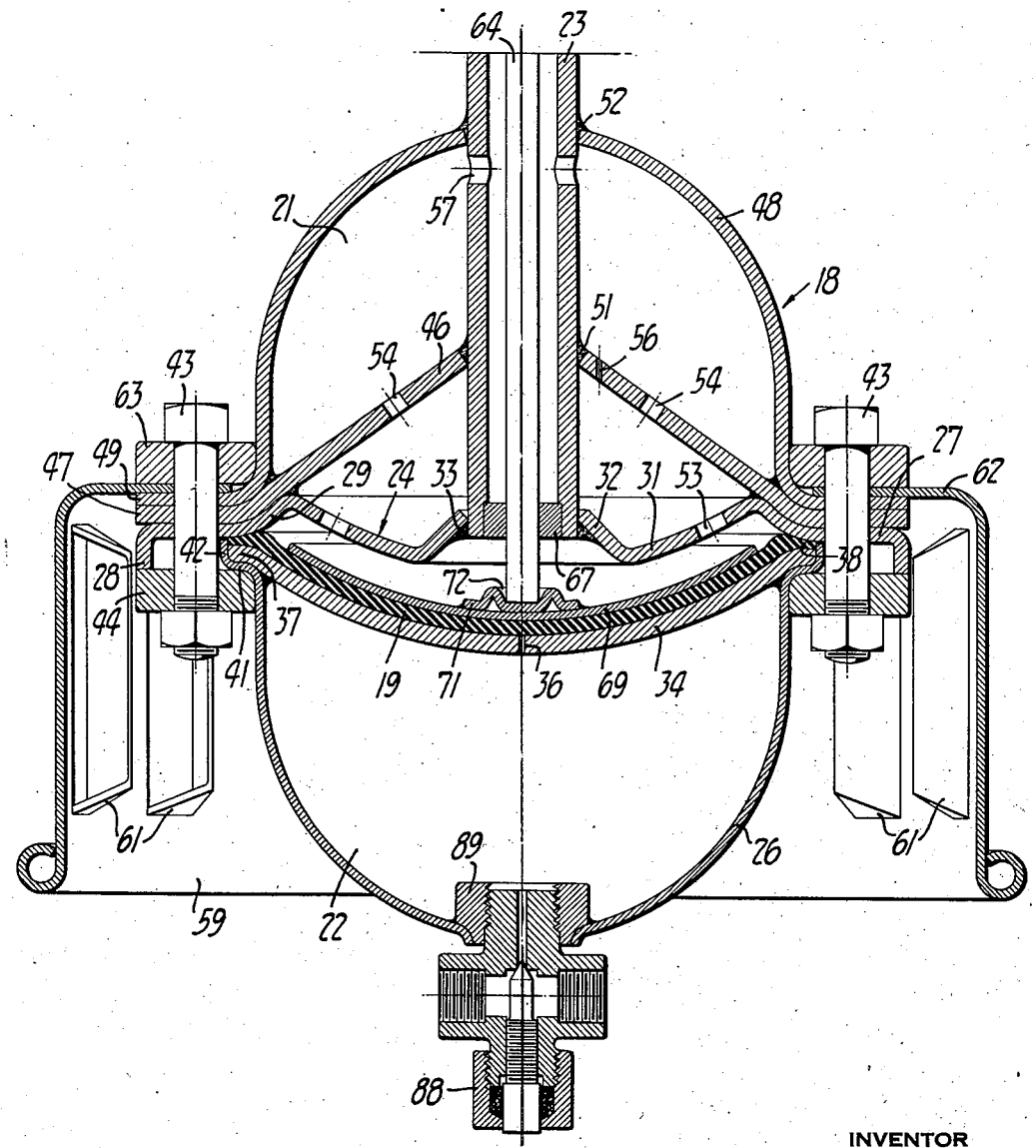

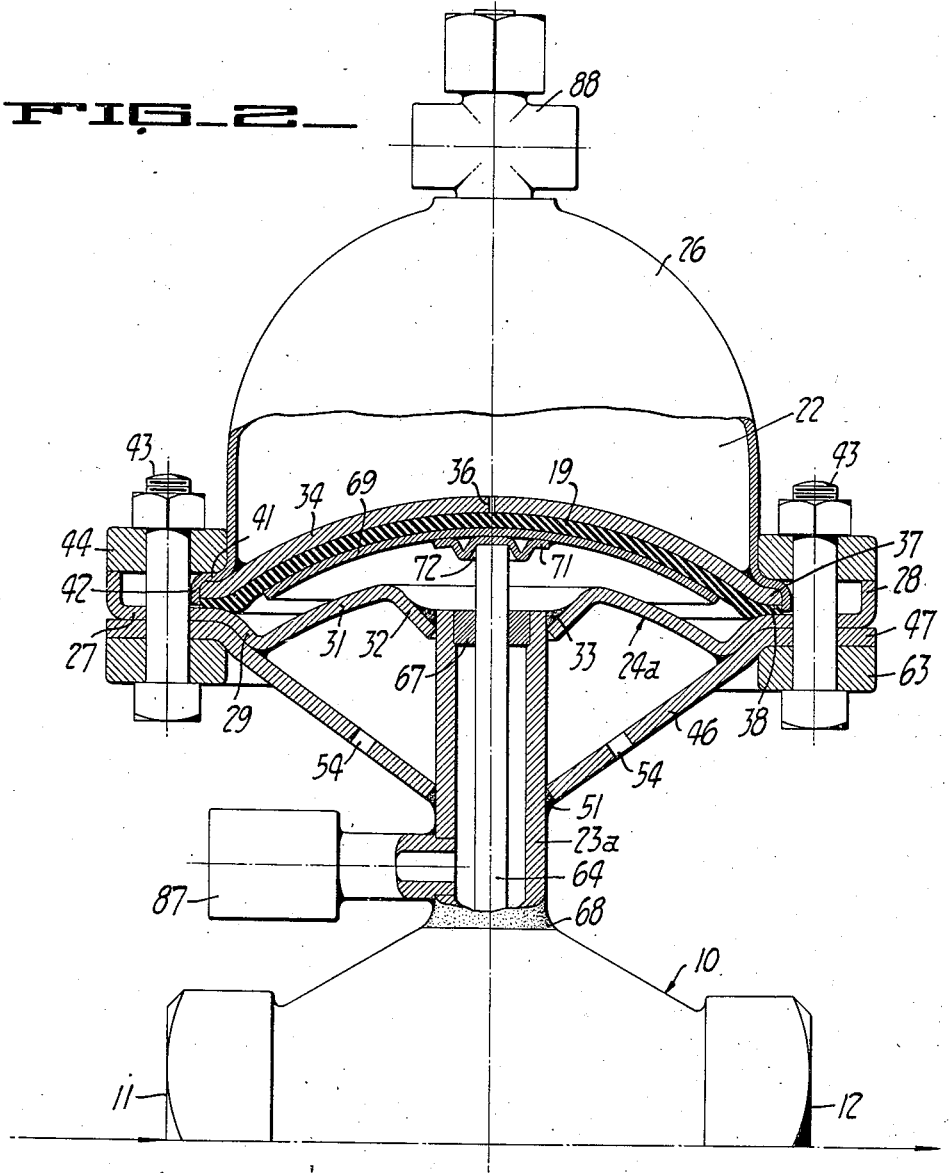

2,295,208

UNITED STATES PATENT OFFICE 2,295,208

PRESSURE REGULATOR

Marvin H. Grove, Berkeley, Calif.

Application October 4, 1939, Serial No. 297,856

6 Claims. (Cl. 137—156)

This invention relates generally to equipment making use of pressure operated diaphragms, as for example pressure regulators, pressure relief valves, valves operated from a remote source of fluid pressure, or other devices in which motion is imparted by a diaphragm which in turn is urged by application of fluid pressure.

It is an object of the invention to provide an improved type of assembly for use in equipment of the above character, the assembly including a flexible diaphragm and mounting parts providing one or more fluid chambers. More particularly the present invention makes possible use of sheet metal parts as distinguished from heavier castings or forgings.

Another object of the invention is to provide an improved fluid flow regulator having a novel assembly of sheet metal parts for mounting the operating diaphragm.

Further objects and features of the invention will appear from the following description in which the preferred embodiments have been set forth in detail in conjunction with the accompanying drawings.

Referring to the drawings:

Figs. 1A and 1B together form a side elevational view in cross section, illustrating a pressure regulator of the steam type making use of the present invention.

Fig. 2 is a side elevational view in cross section, illustrating application of the invention to a pressure regulator of the gas type.

Referring first to Fig. 1A and Fig. 1B of the drawings, I have shown a pressure regulator including a valve body 10, having inflow and outflow passages 11 and 12. Within this valve body there is a bridge 13 provided with an annular seat ring 14. Valve member 16 cooperates with the seat ring 14, and is urged towards closed position by the compression spring 17. Other details of the assembly illustrated in connection with the valve member and seat ring will be presently described in detail. Below the valve body there is a special mounting 18 for a flexible diaphragm 19. This mounting, or at least its principal part, is formed of suitable sheet metal pressed to forms such as will be presently described.

In the embodiment of Fig. 1 the mounting 18 includes parts forming a fluid chamber 21 upon the upper side of diaphragm 19, and a gas chamber 22 upon the lower side of the diaphragm adapted to contain gas under pressure. That part of the mounting which serves as an attachment to the body 10, consists of a tube 23 formed of suitable metal such as steel. Suitable seamless tubes for this purpose can be purchased on the open market as standard mill stock.

Although a number of sheet metal parts are utilized forming the particular assembly illustrated in Fig. 1, I shall refer first to the parts 24 and 26, immediately above and below the diaphragm. Both of these parts are annular in contour, but part 24 is considerably larger in diameter than part 26. Part 24 includes the relatively flat annular flange 27, which has an integral depending annular rim or secondary flange 28. Rim 28 forms an abutment shoulder for certain clamping elements as will be presently explained. The remainder of part 24 may be pressed to a form capable of affording considerable rigidity. For example in the form illustrated there is a frusto-conical section 29 inwardly of the flange 27, and inwardly of portion 29 there is a spherically shaped portion 31. This in turn merges with the upturned inner edge 32, which is shown attached to the lower end of tube 23 as by means of a welded connection 33.

Extending in close proximity with the lower side of diaphragm 19 there is a rigid baffle plate 34 provided with a small flow restricting orifice 36, and capable of functioning substantially the same as the baffle plate disclosed in my Patent No. 2,047,101 to prevent abrupt movements such as cause chattering or slapping of the valve upon its seat. In the assembly illustrated baffle plate 34 is annularly contoured and spherical shaped to accommodate an annularly contoured and spherical shaped diaphragm. While it is desirable to utilize a spherical shaped diaphragm in this instance, it is possible to utilize a substantially flat or planar diaphragm, in which event the baffle plate 34 is likewise flat.

The outer edge portion 37 of baffle plate 34 forms an annular surface for clamping against the peripheral edge portion 38 of the diaphragm. The peripheral edge portion of the sheet metal part 26 is shown formed in such a manner as to embrace the edge portion 37 of plate 34. In other words a flange portion 41 is provided, together with a rim or secondary flange 42 which embraces the periphery of plate 34, and which is dimensioned to afford a recess to receive the margin 38 of the diaphragm.

Aside from the additional parts which the assembly may include, the parts 24 and 26 are retained together by a row of circumferentially spaced screws or bolts 43. These bolts extend through an annular clamping ring 44, the inner edge of which is adapted to rest upon the rim 41 of part 26, and the outer edge of which engages the flange 28. It may be explained at this point that the diaphragm 19 is generally of a resilient material, such as rubber or synthetic rubber, which can be squeezed to form a pressure tight seal. If a diaphragm of the flexible sheet metal type is employed, then a suitable compressible gasket is employed to afford a proper seal.

In a pressure regulator the part may be called upon to withstand relatively high gas pressures. A general spherical shape for part 26 as illustrated affords strength against internal pressure. Strength is also afforded by the manner in which the margins of both parts 24 and 26 are flanged. For the purpose of lending greater strength to the assembly, it is desirable to attach the margin of plate 34 to the rim and flange portions 41 and 42, as by means of brazing or welding.

In addition to the parts 24 and 26, together with the diaphragm plate 34, the assembly of Fig. 1 includes a generally conical shaped part 46, having a flange 47 overlying the flange 27 on part 24. Also overlying part 46 there is a spherical shaped shell 48, having a rim 49 overlying the rim 47. Both parts 46 and 48 have weld connections 51 and 52 with the tube 23, and their outer flanges 47 and 49 can be integrally bonded together and to the rim 27 of part 24, as by welding or brazing. Parts 24 and 46 are shown provided with openings 53 and 54, so that the space above the diaphragm 19 embraced by the shell 48, forms the fluid chamber 21. The upper end of part 46 is provided with a vent 56, to prevent entrapment of gas or vapor. The interior of tube 23 is also shown communicating with the upper part of chamber 21, through openings 57. Member 46 lends strength to the assembly and to the connection between the assembly and the tube 23. Shell 48 is primarily for the purpose of affording a chamber 21 of sufficient volumetric capacity for the purposes desired.

In order to aid in the dissipation of heat I have shown an additional sheet metal part 59 which is generally cylindrical shaped, and which is provided with circumferentially spaced louvers 61. The inturned annular flange 62 on the upper end of member 59 is clamped between the flange 49 and the upper clamping ring 63. The bolts 43 extend through all of the flanges described above, and through the clamping rings 44 and 63.

In order to transmit motion from the diaphragm 19 to the valve member 16, I have shown a rod 64 extending through tube 23, and guided by the upper and lower bushings 66 and 67. The upper end of tube 23 is secured to the valve body 10, as by means of a welded connection 68.

With the spherical shaped diaphragm 19 illustrated, a substantially spherical shaped movable diaphragm plate 69 is employed. The central portion of this plate is provided with a brazed or welded on pad 71, which is provided with a center recess 72 to form a seat for the lower end of rod 64.

Above the bushing 66 rod 64 can be provided with a conical deflector skirt 73, and the upper face of the bushing 66 can also be conical shaped, thereby preventing direct blow down of steam or other fluid through the clearance between rod 64 and bushing 66.

For the purpose of retaining the seat ring 14 in proper position upon bridge 13, it is shown engaged by the lower end of a sleeve 76, which in turn is loosely retained within a bore 77 formed in the upper end of the valve body. The lower end of this sleeve is seated upon the ring 18, and is provided with ports or slots 78 for passage of fluid. A bushing 79 is carried by sleeve 76, and serves to guide the stem 81 of valve member 16. A closure 82 seals the bore 77, and is retained in place by the threaded nut 83. Interposed between the closure 82 and the adjacent end of sleeve 76, are the resilient Bellville springs 86, which serve to transmit thrust through the sleeve to properly hold the seat ring 14 upon the bridge, while at the same time enabling sleeve 76 to take a position to properly align the valve with respect to the seat ring, irrespective of misalignment of the bore 77 with respect to the machining of the bridge 13. Fitting 87 communicates with the upper end of the tube 23, and when the device is used as a steam regulator, a pipe connects to this fitting to establish communication with the outlet side of the valve body.

The part 26 is shown provided with a fitting 88, which carries the needle valve. The fitting is threaded within a spud 89, which in turn is brazed or welded to the sheet metal wall of part 26. Gas can be introduced into or vented from fitting 88 to afford a desired loading pressure upon the diaphragm.

Assuming that the apparatus shown in Fig. 1 is being used as an automatic steam regulator, condensate in chamber 21 will amply blanket the top of the diaphragm 19. Steam pressure from the outflow side is transmitted to the interior of tube 23, whereby such pressure is applied through the pool of condensate to the upper side of the diaphragm 19. Gas under pressure is maintained in chamber 22 at a value corresponding generally to the pressure desired upon the outflow side. Gas at a definite pressure can be trapped in chamber 22, or this chamber may connect to an external source of gas of fixed pressure. Fluid forces acting upon the diaphragm 19 flex the diaphragm to automatically position valve member 16 and thus automatically maintain the pressure upon the outflow side.

With the exception of tube 23 all of the parts below the valve body, which form a mounting for the diaphragm 19 and which form the fluid chambers upon opposite sides of this diaphragm, are formed of sheet metal which is formed by punching and pressing operations. Ordinary cold rolled steel can be employed in many instances, or where corrosion may be encountered special metal alloys in sheet metal form, such as stainless steels, can be used. The sheet metal parts need not be made of a high degree of accuracy, and substantially no machining is required before or after fabrication. Manufacture involves primarily pressing and punching operations, and fabrication involves merely fitting the parts together, together with the necessary brazing or welding operations. The annular rim 29 upon the periphery of the member 24 makes possible proper rigidity, and in addition cooperates with the clamping ring 44, to secure adequate force in clamping parts 24 and 26 together upon the diaphragm.

Parts formed as described above will provide structure relatively light in weight compared to the weight of parts formed of cast metal or forgings. In addition the sheet metal construction can be made and assembled at a cost substantially less than use of cast metal or forgings.

Fig. 2 illustrates the manner in which the arrangement of Fig. 1 can be modified, where one desires to use the apparatus upon various gases in place of steam. Thus the tube 23a is made considerably shorter, and the shell 48 together with the heat dissipating member 59, have been omitted. The part 24a corresponding to part 24 of Fig. 1, has been made imperforate, so that a closed chamber 21a is formed below the diaphragm, in communication with the interior of tube 23a. In instances where member 24a affords sufficient strength for the attachment to tube 23a, one can also dispense with the conical shaped member 46.

I claim:

1. In pressure operated means of the character described, an angularly contoured part formed of pressed sheet metal, the periphery of said part being provided with a substantially cylindrical shaped rim to form an abutment shoulder, a flexible diaphragm having a diameter substantially less than the diameter of said part but extending across one side of said part, another annularly contoured part formed of pressed sheet metal and forming a fluid space upon the other side of the diaphragm, a rigid diaphragm plate extending across the face of said last named part in close proximity with the diaphragm, a peripheral edge portion of said last named part being formed to embrace the peripheral edge portion of the diaphragm plate, the peripheral edge portion of the plate together with an annular surface of said first named part, forming opposed shoulders for gripping the peripheral edge portion of the diaphragm, the peripheral edge portion of the second named part being concentric with respect to the rim formed on the first named part and spaced inwardly from the same, screws or bolts extending through the first named part in an annular area extending between said rim and the peripheral edge portion of the second named part, and elements engaged by said bolts engaging said rim and the peripheral edge portion of the second named part for urging the two parts together upon the diaphragm.

2. In a pressure operated means of the character described, a flexible diaphragm, parts disposed on opposite sides of the diaphragm and forming fluid chambers, said parts having sealed engagement with a peripheral edge portion of the diaphragm, one of said parts being formed with an integral flange on its periphery with an outer flange diameter substantially greater than the diameter of the diaphragm, and a generally cylindrically shaped heat dissipating member formed of sheet metal and having an inwardly projecting flange disposed in overlapping heat conducting relationship with said first-named flange, said member having circumferentially spaced openings for passage of convection currents of air.

3. In a pressure operated means of the character described, a flexible diaphragm, parts disposed on opposite sides of the diaphragm and forming fluid chambers, said parts having sealed engagement with a peripheral edge portion of the diaphragm, one of said parts being formed with an integral flange on its periphery with an outer flange diameter substantially greater than the diameter of the diaphragm, a generally cylindrically shaped heat dissipating member formed of sheet metal and having an inwardly projecting flange disposed in overlapping heat conducting relationship with said first-named flange, and louvers formed in circumferentially spaced relation about the cylindrical portion of said member.

4. In pressure operated means of the character described, an annularly contoured part provided with a substantially cylindrical shaped rim to form an annular abutment shoulder, a flexible diaphragm having a diameter substantially less than the diameter of said rim but extending across one side of said part in a region embraced by the rim, a second annularly contoured part formed of pressed sheet metal and forming a fluid space upon the other side of the diaphragm, a diaphragm plate extending across the face of said last named part in proximity with the diaphragm, the peripheral edge portion of said last named part being outwardly flanged and provided with an annular rim to embrace the peripheral edge portion of the diaphragm plate, the peripheral edge portion of the plate together with an annular surface of said first named part forming opposed shoulders for gripping the peripheral edge portion of the diaphragm, the peripheral edge portion of the second named part being concentric with respect to the rim formed on the first named part and spaced inwardly from the same, and means for clamping said parts together upon the diaphragms.

5. In pressure operated means of the character described, an annularly contoured part provided with a substantially cylindrical shaped rim to form an annular abutment shoulder, a flexible diaphragm having a diameter substantially less than the diameter of said rim but extending across one side of said part in a region embraced by the rim, a second annularly contoured part formed of pressed sheet metal and forming a fluid space upon the other side of the diaphragm, a diaphragm plate extending across the face of said last named part in proximity with the diaphragm, the peripheral edge portion of said last named part being outwardly flanged and provided with an annular rim to embrace the peripheral edge portion of the diaphragm plate, the peripheral edge portion of the plate together with an annular surface of said first named part forming opposed shoulders for gripping the peripheral edge portion of the diaphragm, the peripheral edge portion of the second named part being concentric with respect to the rim formed on the first named part and spaced inwardly from the same, clamping screws or bolts extending through the first named part in an annular area extending between said rim and the peripheral edge portion of the second named part, and a clamping ring engaged by said bolts and surrounding said second named annularly contoured part, said ring engaging the flanged portion of said second named part and also engaging said abutment shoulder.

6. In pressure operated means of the character described, an annularly contoured part formed of pressed sheet metal, the periphery of said part being provided with a substantially cylindrical shaped rim to form an abutment shoulder, a flexible diaphragm having a diameter substantially less than the diameter of said part and extending across one side of said part, another annularly contoured part formed of pressed sheet metal and forming a fluid space upon the other side of the diaphragm, a rigid diaphragm plate extending across the face of said last named part in proximity with the diaphragm, a peripheral edge portion of said last named part being outwardly flanged and provided with a rim to embrace the peripheral edge portion of the diaphragm plate, the rim being dimensioned to form an annular shoulder embracing the outer edge of the diaphragm, the peripheral edge portion of the diaphragm plate together with an annular surface of said first named part forming opposed shoulders for gripping the peripheral edge portion of the diaphragm, the peripheral edge portion of the second named part being concentric with respect to the rim formed on the first named part and spaced inwardly from the same, and means for releasably clamping said parts together upon the diaphragm, said means including screws or bolts extending through the first named part in an annular area extending between said rim and the peripheral edge portion of the second named part, and a clamping ring engaging both the abutment shoulder and the flange upon the second named part.

MARVIN H. GROVE.